Feb. 25, 1930.  H. BOLTSHAUSER  1,748,827
HYDRAULIC CLUTCH MECHANISM
Filed June 23, 1927
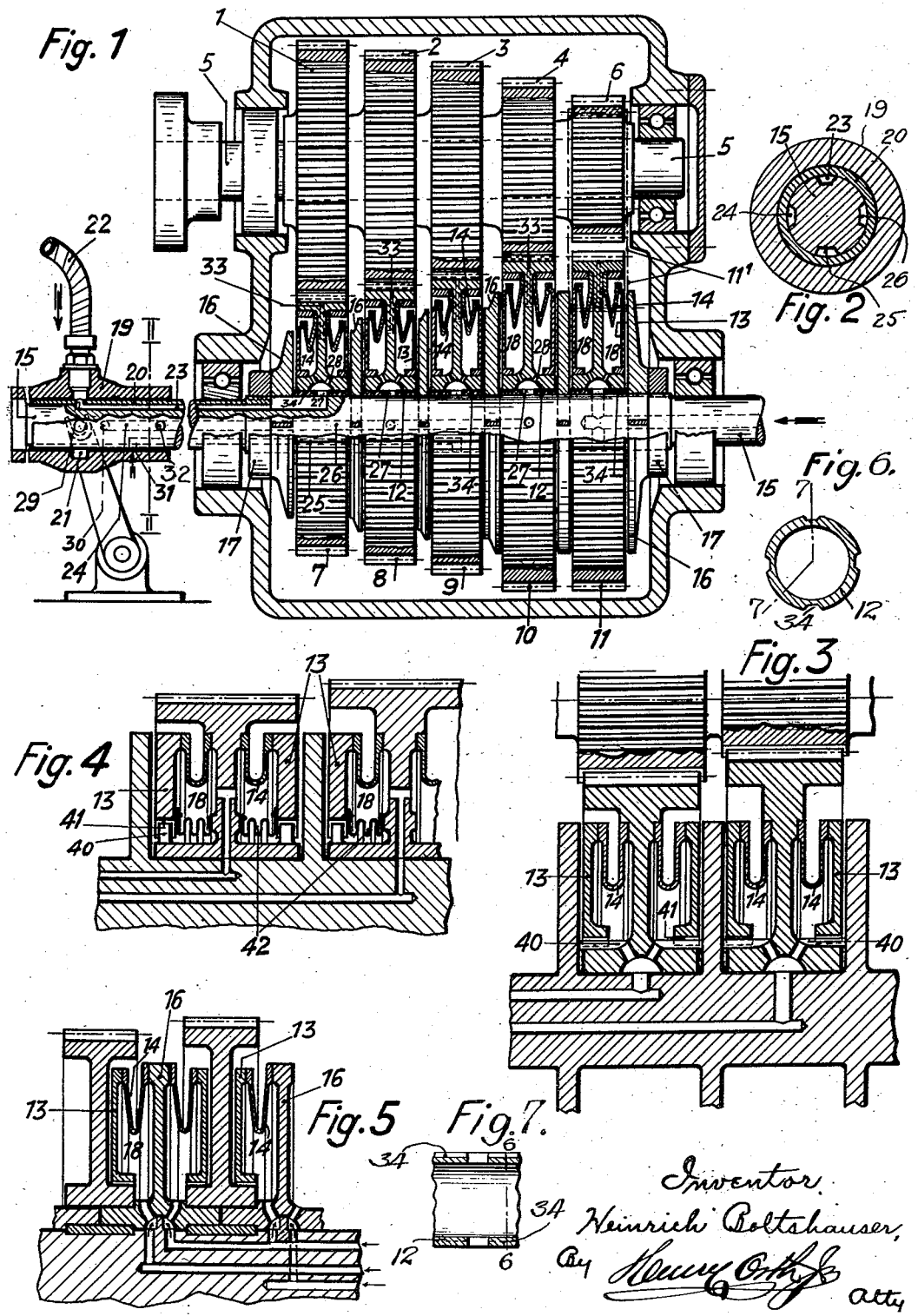

Patented Feb. 25, 1930

1,748,827

UNITED STATES PATENT OFFICE

HEINRICH BOLTSHAUSER, OF ZURICH, SWITZERLAND, ASSIGNOR TO THE FIRM AKTIENGESELLSCHAFT DER MASCHINENFABRIKEN ESCHER WYSS & CIE., OF ZURICH, SWITZERLAND

HYDRAULIC CLUTCH MECHANISM

Application filed June 23, 1927, Serial No. 200,950, and in Switzerland June 26, 1926.

The invention relates to variable or so-called "change speed" gearing of the type in which the engagement and disengagement of each of the several speeds is effected by hydraulically or pneumatically operated diaphragm clutches. Change speed gears of this type have the advantage that they permit easy and gradual starting, facilitate silent speed changing, are easily actuated and are of a comparatively simple and reliable construction.

The object of the present invention is to provide, in change speed gearing of this type, an improved construction of diaphragm clutch in which it is possible to provide large operative surfaces that are particularly suitable for the transmission of heavy torques and in which the necessity for guides for the friction discs of the clutch is obviated.

For this purpose a clutch is provided, in conjunction with each speed stage, having friction discs, mounted on the hubs of the gear wheels and attached to one of the clutch parts by means of elastic diaphragms which are made stiff in a radial direction and are attached to the discs close to the outer periphery of the latter.

Such a clutch, constructed in accordance with the present invention, has the advantage that the diaphragms permit axial but no radial displacement of the friction discs and allow the latter to be, in a certain sense, suspended from the diaphragms. In consequence, the friction discs need not fit exactly on the hubs of the gear wheels and a certain amount of clearance may be allowed between the discs and the hubs, so that any sticking of the discs is avoided and excessive friction is precluded.

Further, the provision in change speed gears of clutches having elastic members of the type referred to, has the advantage, inherent in all clutches of this type, that the disengaging of the gear when the hydraulic or pneumatic pressure is reduced, is solely effected by the elastic member, which feature ensures that the clutch parts of the inoperative gear trains are not subjected to any wear, and that the no-load losses in these parts are reduced to a minimum. These advantages are of particular importance when clutches have to be provided for a large number of gear trains.

Different constructional examples of the subject matter of the present invention are illustrated in the accompanying drawings, in which:

Fig. 1 shows a change speed gear in an axial longitudinal section with parts shown in elevation;

Fig. 2 shows on a larger scale a section along line II—II in Fig. 1;

Fig. 3 shows in an axial longitudinal section parts of a change speed gear in which movable friction discs of one half of the clutch are provided with notches with which projections of another part of the other clutch half cooperate;

Fig. 4 shows in an axial longitudinal section a portion of a change speed gear in which movable friction discs are connected at their inner and outer circumference with one half of the clutch by means of elastic members;

Fig. 5 shows in an axial and longitudinal section a portion of a change speed gear in which elastic members connect parts of the driven coupling halves.

Fig. 6 is a cross section of bush 12 on line 6—6 Fig. 7.

Fig. 7 is a longitudinal section of a portion thereof on line 7—7 Fig. 6.

With the change speed gear illustrated in Figs. 1 and 2 the gear wheels remain permanently in mesh, i. e. also during the idle running, so that in changing from one speed to another no running gear wheels have to be shifted into mesh but only a simple device for distributing the pressure fluid has to be provided.

1, 2, 3 and 4 designate gear wheels for the first, second, third and fourth forward speeds mounted on a shaft 5 driven by a motor not illustrated, whilst 6 is a pinion keyed to the shaft 5 for the reverse speed, which pinion cooperates with an intermediate wheel $11^1$ indicated in dotted lines. The gear wheel 1 is permanently in mesh with a gear wheel 7, the gear wheel 2 is permanent mesh with a gear wheel 8, the gear wheel 3 with a gear wheel 9 and the gear wheel 4 with a gear wheel 10. The intermediate gear wheel 11¹ for the reverse speed is in permanent mesh with a gear wheel 11. Each of the gear wheels 7, 8, 9, 10 and 11, which run loosely on bushes 12, forms a part of one clutch half of hydraulically operated clutches which shall be described below. The bushes 12 are provided with longitudinal grooves 34 shown in dotted lines in Fig. 1 and in detail in Figs. 6 and 7. 13 denotes friction discs arranged on both sides of the gear wheels 7, 8, 9, 10 and 11 and connected to the outer circumference of the latter by means of elastic members 14, the friction discs serving to cooperate with friction discs 16 of the second clutch half, which are rigidly mounted on the driven shaft 15. The friction discs 13 extend from the hub towards the rim of the gear wheels 7, 8, 9, 10 and 11. Every one of these gear wheels together with a friction disc 13 and a member 14 forms a chamber 18 for the reception of pressure liquid. With the exception of the first and the last disc 16 each of such discs forms a part of two adjacent speed clutches. The bushes 12 and discs 16 are held non-displaceable in the axial direction on the shaft 15 between two rings 17 screwed to the shaft 15 and pressing the parts 12 and 16 against each other. The gear wheels 7, 8, 9, 10 and 11 are provided with bores 33 which are permanently connected to a space in which a pressure is present which is lower than the pressure present in the chamber 18 of the respective speed train when its clutch is operative.

In Figs. 1 and 2 a device for distributing the pressure liquid is shown which controls the admission of pressure oil to the pressure chamber 18 of the different clutches i. e. to the different gear wheels 7, 8, 9, 10 of the forward speeds in dependency on the position of a controlling member. The admission of pressure oil to the chambers 18 of the gear wheel 11 for the reverse speed is controlled by a device which is to be actuated independently of the device for controlling the forward speeds. For the sake of simplifying the drawings this second controlling device is not shown in the drawings.

The controlling device illustrated in Figs. 1 and 2 comprises a ring 19 displaceably arranged on a sleeve 20 rigidly fixed to the shaft 15. Inside the ring 19 an annular chamber 21 is provided to which a conduit 22 for supplying pressure oil is connected. The shaft 15 is provided with four grooves 23, 24, 25 and 26, of which groove 23 is in connection with the pressure chambers 18 of the clutch for the first speed by means of channels 27 and 28 in the bush 12 and in the gear wheel 7 respectively, whilst the grooves 24, 25 and 26 are connected to the pressure chambers 18 of the clutches for the second, third and fourth speed respectively by similar channels. The cross-sectional area of the channels 28 is considerably larger than that of the bores 33. The sleeve 20 is provided with four bores 29, 30, 31 and 32 which cooperate with the grooves 23, 24, 25 and 26 respectively. By axially displacing the ring 19 along the sleeve 20 the chamber 21 may be brought into open connection with the grooves 23, 24, 25 or 26 respectively and the first, second, third or fourth speed respectively is thrown in.

If a determined speed of the above described change speed gear is to be thrown in, the ring 19 is so adjusted that to the chambers 18 of the respective stage pressure fluid, which advantageously consists of lubricating oil, is admitted. After the liquid pressure has overcome the spring power of the elastic member 14 of that stage which opposes an axial displacement of the friction discs 13, the latter will be pressed against the adjacent discs 16 so that by these parts 13 and 16 contacting with each other the turning movement of the shaft 5 is transmitted to the shaft 15 at a ratio determined by the operative speed train. The elastic members 14 of that stage have been tensioned when the friction discs 13 are pressed against the discs 16. As the surface of the discs 13 on which the pressure liquid acts and the cooperating surfaces of the parts 13 and 16 are large, large powers may be transmitted by the clutch faces. In the operative stage, pressure fluid flows continuously through the grooves 34 to the cooperating faces of the parts 13, 16 and through the bores 33 to the outer circumference of the driven gear wheel of the respective stage; however, as already mentioned, the diameter of the bores 33 is much smaller than that of the bores 28, so that the last mentioned quantity of pressure fluid is small as compared to that flowing through the bores 28. Further the clearance between the discs 13 and the hub of the gear wheels may be considerable as on account of the comparatively small diameter of the bores the quantities of pressure liquid flowing through by said clearance are small and may at the same time be used for lubricating and cooling purposes.

In order to render the gear inoperative the supply of pressure liquid to the pressure spaces 18 is cut off. Pressure medium escapes then from the spaces 18 through the bores 33 and as the latter end in a space the pressure in which is lower than the pressure in the spaces 18, the pressure in the spaces 18 decreases thus quickly and the tensioned elastic members 14 of the stage that has last been operative automatically pull the friction discs 13 away from the friction discs 16 by a comparatively large distance shortly after the supply of pressure medium has been cut off. In this manner the pressure medium still present between the friction discs 13 and 16 of the inoperative stages cannot cause friction losses of any importance. As the axial grooves 34 permit a lubrication of the surfaces of the parts 13 and 16 intended for co-operation, a dry grinding when putting in the different speeds, is prevented so that no damage may occur. As has already been mentioned the lubricating oil flowing to the working faces of the friction discs 13, 16 of the operative stage through the grooves 34 may for the greatest part lead off the heat generated during an eventual slipping of the clutch parts.

The above described change speed gear presents the advantage that the pressure medium flows through all the channels always in the same direction, so that, for instance no special devices are necessary for permitting a flow of the pressure medium through the grooves 23, 24, 25 and 26 in the opposite direction to cause a disengagement of a clutch. The arrangement is further such that simultaneously with the cutting in of one speed the cutting out of the heretofore operative speed occurs automatically, all the operations being performed noiselessly and gradually, i. e. without causing jerks and shocks.

The shape of the elastic members is of no importance for the invention provided these members are able, when the supply of pressure medium is cut off, to automatically distance the friction discs to which they are connected so far from the second half of the coupling that the pressure medium present in the gear casing cannot cause any appreciable friction losses.

In many cases it is desirable to relieve the elastic members 14 as much as possible from the forces which have to be transmitted from the driving part to the driven part. This may be attained in the manner shown in Fig. 3 by providing those gear wheels, which correspond to the gear wheels 7, 8, 9, 10 and 11 of the first constructional example, with projections 40 cooperating with notches 41 of the friction discs 13.

Fig. 4 shows a modification in which the friction discs 13 are not only connected at their outer circumference by means of an elastic member 14 with a gear wheel but also at their inner circumference by means of a second elastic member 42. The latter acts mainly as a packing; in order to relieve the outer elastic members 14 as much as possible from the forces to be transmitted also in this case projections 40 and notches 41 are provided. The provision of inner elastic members 42 is to be recommended in every case in which from any reason leakage losses of the pressure fluid from the pressure chambers 18 are not admissible or if a pressure fluid is utilized which should not mix with the liquid serving for lubricating the gear.

In the above described constructional examples the friction discs 13 are connected by means of an elastic member 14 with the driving half of the clutch of the different stages. However as is shown in Fig. 5, the friction discs 13 may be connected by means of elastic members 14 with the discs 16 forming the driven part of the clutches. In this case the pressure chambers 18 are bounded by a friction disc 13, an elastic member 14 and a disc 16; the manner of working is the same as in the constructional examples illustrated in Figs. 1 and 2 or 3 and 4 respectively.

I claim:

1. A fluid clutch comprising in combination, a shaft, a wheel-shaped member loosely mounted on said shaft and forming one clutch-half, a second clutch-half rigidly connected to said shaft, at least one folded diaphragm stiff in a radial direction and attached at one end to one of said clutch-halves, a friction disc connected to each diaphragm and attached substantially at its outer edge to said diaphragm so as to be suspended from the latter, each friction disc extending from the hub of said wheel-shaped clutch member toward its periphery and forming together with the diaphragm to which it is attached and with the clutch member to which said diaphragm is connected a chamber for the reception of fluid under pressure, and means to supply pressure fluid to said chambers in order to press the friction discs into contact with the clutch-half to which they are not attached, said friction discs surrounding the hub of the wheel-shaped clutch member with an amount of clearance through which fluid supplied to the chambers is allowed to flow to the cooperating surfaces of the friction discs and the clutch-half to which said discs are not connected.

2. A fluid clutch comprising in combination, a shaft, a wheel-shaped member loosely mounted on said shaft and forming a part of one clutch-half, a second clutch-half rigidly connected to said shaft, at least one folded radially stiff diaphragm attached at one end to one of said clutch-halves, a friction disc marginally connected with each diaphragm so as to be suspended from the latter, each friction disc extending from the hub of said wheel-shaped clutch member towards its periphery and forming together with the diaphragm to which it is attached and with the clutch member to which said diaphragm is connected a chamber for the reception of fluid under pressure, means to supply pressure fluid to said chambers to press the friction discs into contact with the clutch-half to which they are not attached, said friction discs surrounding the hub of the wheel-shaped clutch member with an amount of clearance through which fluid supplied to the chambers is allowed to flow to the cooperating surfaces of the friction discs and the clutch-half to which said discs are not connected, a casing in which a pressure is present which is lower than the pressure in the chamber to which pressure fluid is supplied, and a permanent connection between each of said chambers and said casing, the cross-sectional area of the means for supplying pressure fluid to the chambers being considerably larger than the cross-sectional area of said permanent connection.

3. A fluid clutch, comprising in combination, a shaft provided with disc-shaped bodies rigidly connected therewith, a wheel-shaped clutch member loosely mounted on said shaft between two of said disc-shaped bodies, two friction discs arranged on both sides of said wheel-shaped clutch member and each extending from the hub towards the periphery of said clutch-member and surrounding said hub with clearance, two folded, radially stiff diaphragms, each fixed at one end to said wheel-shaped clutch-member and the other diaphragm-end attached to one of the friction discs closed at its outer end so as to be suspended from the corresponding diaphragm, each friction disc forming together with the diaphragm to which it is attached and one side of the wheel-shaped clutch-member a chamber for the reception of fluid under pressure, inter-engaging projections provided on the inner peripheries of the discs and on the hub of said wheel-shaped member for mainly transmitting power from the member to the friction disc, and means to supply pressure fluid to said chambers to press the friction discs into contact with said disc-shaped bodies, a portion of the fluid supplied to the chambers being allowed to flow to the cooperating surfaces of the friction discs and the disc-shaped bodies rigidly connected to said shaft.

4. A fluid operated clutch comprising a shaft, disc shaped bodies rigidly connected to said shaft, a wheel member loosely mounted on said shaft between two of said disc-shaped bodies, two friction discs arranged on both sides of said wheel-shaped member and each extending from the hub towards the rim of said member and surrounding said hub with clearance, the working surfaces of said two friction discs beng substantially flush with the end surfaces of the rim of said wheel member, two folded radially stiff diaphragms each fixed at one end to said wheel-shaped member and the other diaphragm-end attached to one of the friction discs, each disc suspended from the corresponding diaphragm, each friction disc forming together with the diaphragm to which it is attached and one side of the wheel-shaped clutch-member a chamber for the reception of fluid under pressure, and means to supply pressure fluid to said chambers to press the friction discs into contact with said disc-shaped bodies.

5. A fluid operated clutch, comprising a shaft, a wheel member loose thereon, two disc members rigidly connected to the shaft and arranged on both sides of said wheel member, each of said disc members having a working surface disposed at right angles to the axis of said shaft, two friction discs each disposed with a working surface substantially at right angles to said shaft opposite the working surface of one of said disc members, said friction discs extending substantially from the hub of the wheel member to its rim, two folded, axially extensible and contractible diaphragms radially stiff and disposed on both sides of said wheel member, each of said diaphragms being connected at one end to one of said friction discs near the outer periphery thereof and at its other end to said wheel member, each diaphragm forming the only connection between the friction disc connected thereto and the wheel member, and each diaphragm enclosing together with one of said friction discs and said wheel member a chamber for the reception of fluid pressure, said chambers situated on both sides of the wheel member and within the space determined by the width of the rim of said wheel member, and means to supply pressure fluid to said two chambers.

In testimony whereof, I have signed my name to this specification.

HEINRICH BOLTSHAUSER.